June 12, 1956 E. DARIAN 2,750,581
DIFFERENTIAL PROTECTION OF PENSTOCKS AND PIPE LINES
Filed April 12, 1954 2 Sheets-Sheet 1

INVENTOR
Ernest Darian
BY
Herbert S. Fairbanks
ATTORNEY

United States Patent Office 2,750,581
Patented June 12, 1956

2,750,581

DIFFERENTIAL PROTECTION OF PENSTOCKS AND PIPE LINES

Ernest Darian, Philadelphia, Pa.

Application April 12, 1954, Serial No. 422,452

4 Claims. (Cl. 340—242)

This invention relates to the penstocks of hydro-electrical power plants and to pipe lines for transmission of fluids or gases.

One object of the invention is to operate an alarm system to attract the attention of the personnel to interrupt the water flow into the penstock after a predetermined time, and to open the device to empty the penstock in case of a leak or break therein and thereby avoid great damage of property and long delays. The invention is especially valuable for hydro-electrical plants with high head.

A further object of the invention is to operate the alarm system so as to attract the attention of the personnel to interrupt the fluid or gas flow into protected sections of the pipe line from both ends in case of a leak or break in the pipe line.

A further object of the invention is to provide a precise device reliable with every load of penstock from 0 to 100% of load.

With the foregoing and other objects in view as will hereinafter appear, my invention comprehends a novel protector for penstocks and pipe lines.

For the purpose of illustrating the invention, I have shown in the accompanying drawings preferred embodiments of it which, in practice, will give satisfactory and reliable results. It is however to be understood that the various instrumentalities of which the invention consists can be variously arranged and organized and the invention is not limited except by the scope of the appended claims to the exact arrangement and organization of these instrumentalities as herein set forth.

Similar numerals of reference indicate corresponding parts.

Figure 1:
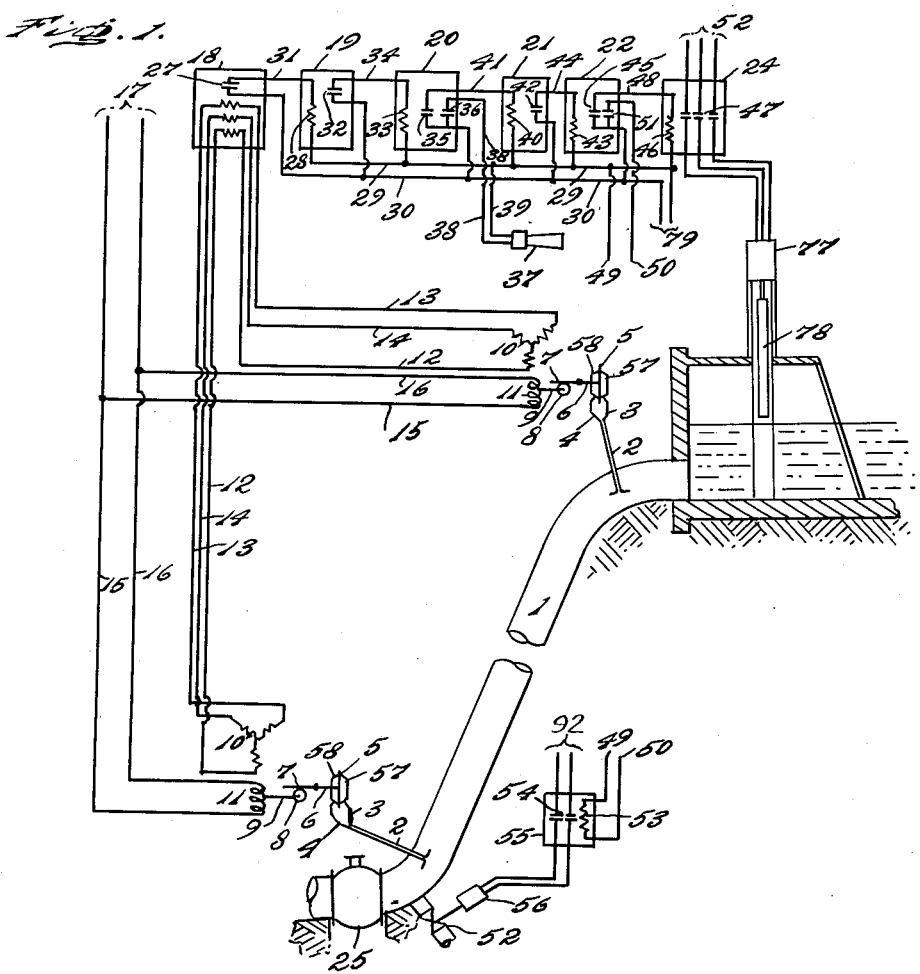
Figure 1 is a schematic view of a differential protector for penstocks and pipe lines, embodying my invention.

Referring to the drawings:

In Figure 1, a penstock 1 has a double Pitot tube 2 for indicating the water velocity pressure located on the center line at the beginning or intake end of the penstock. The outside end 3 of the double Pitot tube 2 is connected to the chamber 57 and the other outside end 4 is connected to a chamber 58 of a diaphragm, differential pressure, responsive device 5. The velocity pressure on the diaphragm is restrained by means of a spring or pendulum on the stem 6 of the device 5. The stem 6 is connected with a rack 7 of a rack and pinion gear. The pinion 8 of such gear is fixed on the shaft 9 of a Selsyn motor, so that for every value of water velocity there will be a certain turning angle of the shaft of the Selsyn motor.

A second double Pitot tube with diaphragm, differential pressure, responsive device and Selsyn motor is located at the discharge end of the penstock before the turbine valve 25. The component parts are connected together in the same way as the first set at the intake end of the penstock and the same reference characters are employed.

The single phase windings 11 of both Selsyn motors are connected parallel to a corresponding A. C. source 17 by conductors 15 and 16. The three phase windings 10 of the first Selsyn motor are connected to the beginnings of magnet coils of a sensitive three phase current relay 18. The three phase windings 10 of the second Selsyn motor are connected to the ends of the magnet coils of the same relay 18 so that each phase of windings 10 and the coils of relay 18 are connected in series, one with the other.

The relay 18, a first time relay 19, a first auxilary relay 20, a second time relay 21, a second auxiliary relay 22 and magnet coils of a contactor 24 are connected as usual and will be later explained.

The contactor 24 operates a closing device 77 of a sluice gate 78.

The device is normally inactive when the penstock does not leak because the water quantities which pass through the upper cross section and through the lower cross section of the penstock where the Pitot tubes are mounted are the same, and consequently the water velocities are the same. Since the water velocities are the same, the turning angle of the shafts of the Selsyn motors are the same, and in the three phase windings of the motors there is no current. Since there is no current, the relay 18 is not energized, its contacts 27 are open, and the entire device is inactive.

When there is a leak in the penstock between the points where the Pitot tubes are located, the water quantity which passes through the upper section will be greater than that which passes through the lower section, and the water velocity in the upper section will be higher than in the lower section. Consequently, the turning angle of the first Selsyn motor shaft will be greater than that of the second motor shaft. The presence of different turning angles of these motor shafts creates a current in conductors 12, 13 and 14 and in the three phase coils of the Selsyn motors and relay 18. As soon as the relay 18 is energized, the contacts 27 will close and the coil 28 of time relay 19 will be connected to the control source 79 through conductors 30, 31 and 29. Relay 19, when energized, will after a few seconds close contacts 32 and connect a coil 33 of auxiliary relay 20 to the control source 79 by the conductors 34, 29 and 30. When the auxiliary relay 20 is energized, it will close the contacts 35 and 36. The closing of contact 36 connects the signal system 37 to the control and signal source 79 by the conductors 38, 30, 39, 29. Closing contacts 35 will connect the coil 40 of time relay 21 to the control and signal source 79 by conductors 30, 41 and 29. The connection of the signal system 37 to the control and signal source 79 will give an alarm that the penstock is out of order, and the personnel immediately takes the proper steps to restore the proper operation without if possible shutting down the turbine.

If, after a few minutes, the normal condition is not established, the time relay 21 will close contacts 42 and connect the coil 43 of auxiliary relay 22 to the control source 79 by conductors 30, 44 and 29. The relay 22 being energized will close contacts 45 and 51. The closing of the contacts 45 will connect the magnet coil 46 of contactor 24 to the control source 79 by conductors 30, 42 and 29. Contactor 24 being energized will close contacts 47 and energize the closing device 77 for sluice gate 78 from the power source 92. Closing contacts 51 connects the magnet coil 53 of the contactor 55 to the control source 79 by conductors 49, 29, 30 and 50. Energizing contactor 55 closes the contacts 54 and therewith will connect the operating device 56 (solenoid or motor) of the emptying valve 52 to the power line 92 for emptying the penstock.

The time delay of relay 19 is set for a few seconds to avoid unnecessary alarm signals with occasional unbalances due to the often harmless water hammers.

An interlocking of contactors 24 and 55 is necessary to prevent the operation of this device when filling and emptying the penstock, and for deenergizing contactors 22 and 25 by limit switches.

The relay 18 can be three phase or single phase. The time relays 19 and 21 can be substituted with one time delay with two time delay actions.

Venturi tubes, orifices or other similar devices can be substituted for the Pitot tubes and will not change the connections and operation of this device.

The electric connections can be varied without changing the basic idea of this invention.

Figure 2:
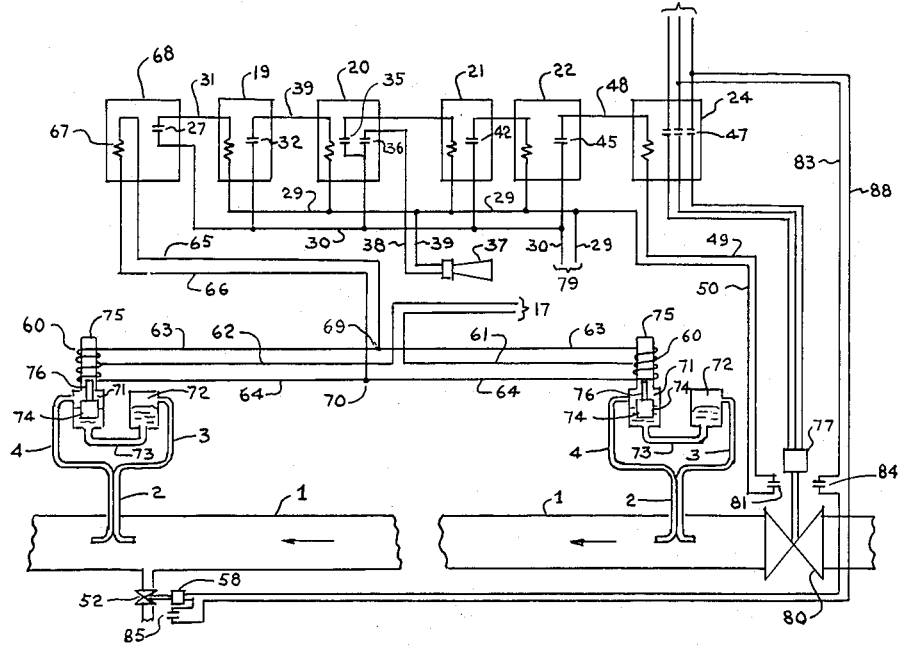
Figure 2 is a wiring diagram of another embodiment of the invention.

Another embodiment of the invention is shown in Figure 2. Two double Pitot tubes 2 with two differential responsive devices comprising chambers 71 and 72 are located one at the beginning and the other at the end of the protected area of the pipe line 1, the pipe diameters at the beginning and at the end being the same. The pipes 3 of both Pitot tubes are connected with the chambers 72 of corresponding differential pressure responsive device, while the pipes 4 are connected to the chamber 71. The chambers 70 and 71 are connected by a pipe 73 and partially filled with a sealing fluid such as mercury. Float 74 in chamber 71 has a soft iron stem 76. The chamber 71 has a continuation 75 within which the stem 76 is located. The impedance coil 60 surrounds the continuation 75. All of the above described parts together form a flow velocity indicator with impedance transmitter known to those skilled in this art. The middle of the first impedance transmitter coil 60 is connected by a conductor 61 with one pole of an A. C. source 17 of corresponding voltage. The middle of the second transmitter coil 60 is connected with the other pole of the same A. C. source 17 by a conductor 62. The beginnings of both transmitter coils 60 are connected together by a conductor 63. The ends of the coils 60 are connected by a conductor 64. Conductors 63 and 64 are connected with the coil 67 of a sensitive relay 68 by conductors 65 and 66 at the points 69 and 70. The auxiliary relay 20 and 22, time relay 19 and 21 and contactors 24 and 55 are connected as in Figure 1 and described below.

Under normal conditions, when the flow velocity at the beginning and at the end of the pipe line are the same, the pressure difference between the chambers 71 and 72 of the first set is equal to the pressure difference between the chambers 71 and 72 of the second set. Therefore the elevation of both floats 74 and their stems 76 is the same. Thereby, the impedances of both coils 60 are equal, and the relay 68 is not energized.

If there is a leak in the protected area, the flow velocity at the beginning will be greater than at the end of the pipe 1. Consequently, the float 74 of the first set will rise higher than the float in the second set, thereby creating different impedances in coils 60. This will create a voltage difference at points 69 and 70 and the relay will be energized. Relay 68 being energized, closes its contacts 27 and the time relay 19 will be energized through conductors 29 and 30 from control source 79. After a few seconds the contacts 32 will be closed and the auxiliary relay 20 will be energized through conductors 29 and 30 from control source 79 thereby closing its contacts 35 and 36 and the signal 37 will operate through conductors 38 and 39 from control source 79. Closing contact 35 the time relay 21 will be energized, and after ten to fifteen minutes will close its contacts 42. Closing contacts 42, the auxiliary relay 22 will be energized and will close its contacts 45 so that the magnet coil 46 of contactor 24 will be energized through conductors 29 and 50, through closed limit switch 81 of valve 80 and conductors 49, 48 and 30 from control source 79. The contactor 24 being energized closes its main contacts 47, connecting the operating mechanism of 77 of valve 80 to the power source 92 for closing the valve 80. When the valve 80 is closed, its limit switch 81 will be opened, thereby deenergizing the contactor 24. When the valve 80 is closed, its limit switch 84 is closed, connecting the operating mechanism 56 of discharge valve 52 to the power source 92 through the conductor 83 through closed limit switch 84 of the valve 80, through closed limit switch 85 of the valve 52 and conductor 88 for opening the valve 52. When valve 52 opens, limit switch 85 opens and the operating mechanism 56 of the valve 52 will be deenergized. Thus, the admission of fluid into the damaged area of the pipe line will be stopped and the whole area will empty.

Figure 3:
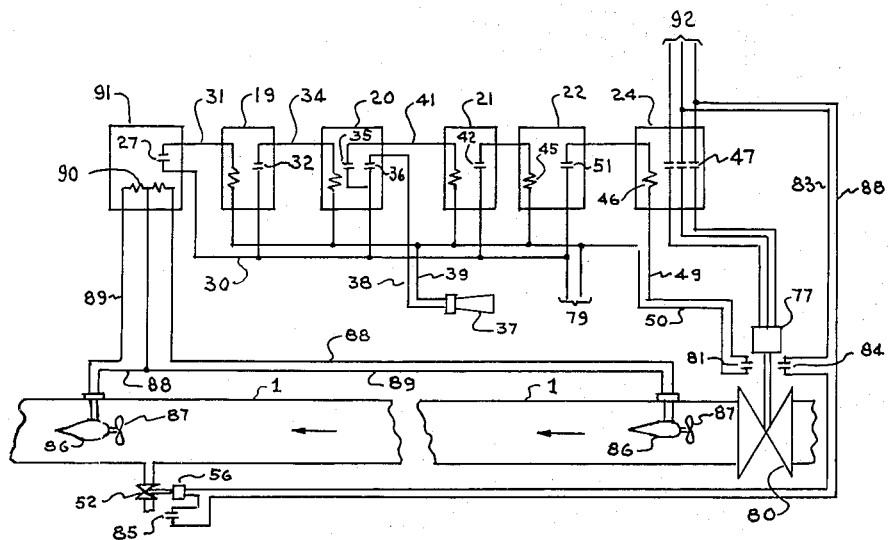
Figure 3 is a schematic view of another form of differential pressure responsive device which may be employed.

In the embodiment seen in Figure 3, two propeller type flow velocity indicators 86 are located, one at the beginning and the other at the end of the protected area of the pipe line. Propellers 81 of indicators 86 are coupled with D. C. generators with permanent magnets so that the generated voltage of indicators are proportional to the corresponding flow velocity. Both generators of indicators 86 are connected to coils 90 of voltage-balance relay 91 by conductors 88 and 89. The time relay 19 and 21, the auxiliary relays 20 and 22, the contactor 24, etc., are connected in the same way as described for Figure 2.

Under normal conditions when the flow velocity at the beginning and at the end of pipe 1 are the same, the generated voltages of both generators are equal and the balance relay will not act and the relays 19, 20, 21 and 22 will stay deenergized.

If a leak occurs in the protected area, the flow velocity at the beginning of pipe 1 will be greater then at the end of pipe 1, and the voltage of the indicator at the beginning of pipe 1 will be greater than the voltage of the indicator at the end of pipe 1. This voltage difference operates the balance relay 91 and its contacts will close. On the closing of contacts 27, the time relay 19 will be energized through conductors 29 and 30 from control source 79. After a few seconds, contacts 32 close and the auxiliary relay 20 will be energized through conductors 29 and 30 from control source 79. The relay will close its contacts 35 and 36. On closing contact 36, the signal 37 will operate through conductors 38 and 39 from control source 79. On closing contacts 35, the time relay 21 will be energized, and after ten to fifteen minutes will close its contacts 42 and the auxiliary relay 22 will be energized and will close its contacts 45. On closing contacts 45, the magnet coil 46 of contactor 24 will be energized through conductors 29 and 50, through closed limit switch 81 of valve 80, and conductors 49, 48 and 30 from control source 79. The contactor 24 on being energized closes its main contacts 47 connecting the power source 92 to the operating mechanism 77 of the valve 80, for closing the latter. When the valve 80 closes, its limit switch 81 is open, thereby deenergizing the contactor 24. On closing the valve 80, the limit switch 84 of the valve will be closed, connecting the operating mechanism 56 of the discharge valve 52 to the power source 92 through the conductor 83, through closed limit switch 84 of valve 80, through closed limit switch 85 of valve 52 and conductor 88. When the valve 52 opens, the limit switch 85 opens and the operating mechanism 56 of the valve 52 is deenergized. Thus, the admission of fluid into the damaged area of the pipe line is stopped and the whole area will be emptied.

Having thus described my invention, what I claim as new and desire to secure by Letters Patent is:

1. A device for indicating a leakage of fluid or gas in a flow line, comprising two flow indicators, one being located at the beginning and the other at the end of the flow line to define a protected area, a balance relay, transmitters connected with said flow indicators and actuating said balance relay by difference of velocity flow at the beginning and the end of the flow line, a time and auxiliary relay system actuated by said balance relay, and means controlled by said system upon leakage in said protected area.

2. A device for indicating leakage of fluid or gas in a flow line, comprising two differential pressure type flow velocity indicators, one being located at the beginning and the other at the end of the same flow line to define a protected area, a balance relay, selsyn transmitters connected with said flow indicators and actuating said balance relay by difference of flow velocity at the beginning and the end of the flow line, a time and auxiliary relay system actuated by said balance relay, and means controlled by said system upon leakage in said protected area.

3. A device for indicating leakage of fluid or gas in a flow line, comprising two differential pressure type flow velocity indicators, one being located at the beginning and the other at the end of the flow line to define a protected area, a balance relay, impedance transmitters connected with said flow indicators and actuating said balance relay by difference in velocity at the beginning and end of the flow line, a time and auxiliary relay system actuated by said balance relay, and means controlled by said system upon leakage in said protected area.

4. A device for indicating leakage of fluid or gas in a flow line, comprising two propeller-generator type flow velocity indicator-transmitters, one being located at the beginning and the other at the end of the flow line to define a protected area, a balance relay, actuated by difference of generated voltage of said propeller-generator-transmitters, a time and auxiliary relay system actuated by said balance relay, and means controlled by said system upon leakage in said protected area.

References Cited in the file of this patent

UNITED STATES PATENTS

| | | |
|---|---|---|
| 759,449 | Kloman | May 10, 1904 |
| 1,745,859 | McElroy | Feb. 4, 1930 |
| 1,977,498 | Staegemann | Oct. 16, 1934 |
| 2,275,317 | Ryder | Mar. 3, 1942 |

FOREIGN PATENTS

| | | |
|---|---|---|
| 601,298 | Great Briatin | May 3, 1948 |